(12) United States Patent

Sugimoto et al.

(10) Patent No.: US 12,678,869 B2

(45) Date of Patent: Jul. 14, 2026

(54) TOOL AND METHOD OF MANUFACTURING TOOL

(71) Applicants: SUMITOMO ELECTRIC HARDMETAL CORP., Hyogo (JP); Sumitomo Electric Industries, Ltd., Osaka (JP)

(72) Inventors: Rintaro Sugimoto, Hyogo (JP); Takashi Harada, Hyogo (JP); Satoru Kukino, Osaka (JP); Taisuke Higashi, Hyogo (JP); Naoki Watanobe, Hyogo (JP); Mayuka Segawa, Hyogo (JP)

(73) Assignees: SUMITOMO ELECTRIC HARDMETAL CORP., Hyogo (JP); Sumitomo Electric Industries, Ltd., Osaka (JP)

( * ) Notice: Subject to any disclaimer, the term of this patent is extended or adjusted under 35 U.S.C. 154(b) by 603 days.

(21) Appl. No.: 17/763,431

(22) PCT Filed: Jun. 14, 2021

(86) PCT No.: PCT/JP2021/022524

§ 371 (c)(1),
(2) Date: Mar. 24, 2022

(87) PCT Pub. No.: WO2021/261316

PCT Pub. Date: Dec. 30, 2021

(65) Prior Publication Data

US 2022/0339719 A1 Oct. 27, 2022

(30) Foreign Application Priority Data

Jun. 22, 2020 (WO) .................. PCT/JP2020/024463
Jun. 22, 2020 (WO) .................. PCT/JP2020/024464
Jun. 22, 2020 (WO) .................. PCT/JP2020/024465

(51) Int. Cl.
*B23C 5/10* (2006.01)

(52) U.S. Cl.
CPC ........ *B23C 5/1009* (2013.01); *B23C 2210/54* (2013.01); *B23C 2226/125* (2013.01); *B23C 2226/315* (2013.01)

(58) Field of Classification Search
CPC .............. B23C 5/1009; B23C 2210/03; B23C 2210/24; B23C 2210/32; B23C 2210/326;
(Continued)

(56) References Cited

U.S. PATENT DOCUMENTS

2007/0253787 A1* 11/2007 Ishii ...................... B23B 27/141
407/113
2009/0032725 A1 2/2009 Hautala
(Continued)

FOREIGN PATENT DOCUMENTS

JP 2006-255814 A 9/2006
JP 2007-313636 A 12/2007
(Continued)

OTHER PUBLICATIONS

WO 2018092364 A1 Translation (Year: 2018).*

*Primary Examiner* — Sunil K Singh
*Assistant Examiner* — Eric Daniel Whitmire
(74) *Attorney, Agent, or Firm* — Renner, Otto, Boisselle & Sklar, LLP

(57) ABSTRACT

A tool of the present disclosure includes a tip end portion. The tip end portion has a surface. At least a part of the surface includes a plurality of protrusions, a first recess provided by contact between ends of two adjacent protrusions of the protrusions, and a second recess different from the first recess. The second recess is provided inside at least one of the protrusions or provided to extend across the two adjacent protrusions.

20 Claims, 17 Drawing Sheets

(58) Field of Classification Search
       CPC ............ B23C 2210/54; B23C 2210/64; B23C
                         2226/125; B23C 2226/315; B23B 27/20
       See application file for complete search history.

(56)                      References Cited

U.S. PATENT DOCUMENTS

| | | | | |
|---|---|---|---|---|
| 2014/0338512 A1 * | 11/2014 | Suzuki | .................... | B23B 27/14 |
| | | | | 83/651 |
| 2019/0054545 A1 * | 2/2019 | Harada | ................ | B23K 26/355 |
| 2019/0134721 A1 | 5/2019 | Waki | | |
| 2020/0361005 A1 | 11/2020 | Tsukihara | | |

FOREIGN PATENT DOCUMENTS

| | | | | | |
|---|---|---|---|---|---|
| JP | 2013-200211 | A | | 10/2013 | |
| JP | 2014-009999 | A | | 1/2014 | |
| JP | 2014-226733 | A | | 12/2014 | |
| JP | 2017119333 | A | * | 7/2017 | |
| JP | 2018-197177 | A | | 12/2018 | |
| JP | 2018-203559 | A | | 12/2018 | |
| WO | 2017/188154 | A1 | | 11/2017 | |
| WO | WO-2018092364 | A1 | * | 5/2018 | ............. B23B 27/14 |
| WO | 2018/116524 | A1 | | 6/2018 | |
| WO | 2019/039005 | A1 | | 2/2019 | |
| WO | 2020/090372 | A1 | | 5/2020 | |

* cited by examiner

TOOL AND METHOD OF MANUFACTURING TOOL

The present application claims a priority based on International Application Nos. PCT/JP2020/024463, PCT/JP2020/024464, and PCT/JP2020/024465 filed on Jun. 22, 2020, the entire contents of which are incorporated herein by reference.

TECHNICAL FIELD

The present disclosure relates to a tool and a method of manufacturing the tool.

BACKGROUND ART

PTL 1 (Japanese Patent Laying-Open No. 2017-119333) discloses a ball end mill. The ball end mill in PTL 1 has a main body portion and an edge portion. The edge portion is attached to a tip end of the main body portion. The edge portion is formed of a diamond sintered material containing diamond particles and a binder. The edge portion has a hemispherical shape. The surface of the edge portion includes recesses and protrusions.

CITATION LIST

Patent Literature

PTL 1 Japanese Patent Laying-Open No. 2017-119333

SUMMARY OF INVENTION

A tool of the present disclosure includes a tip end portion. The tip end portion has a surface. At least a part of the surface includes a plurality of protrusions, a first recess provided by contact between ends of two adjacent protrusions of the protrusions, and a second recess different from the first recess. The second recess is provided inside each of the protrusions or provided to extend across the two adjacent protrusions.

DETAILED DESCRIPTION

Figure 1:
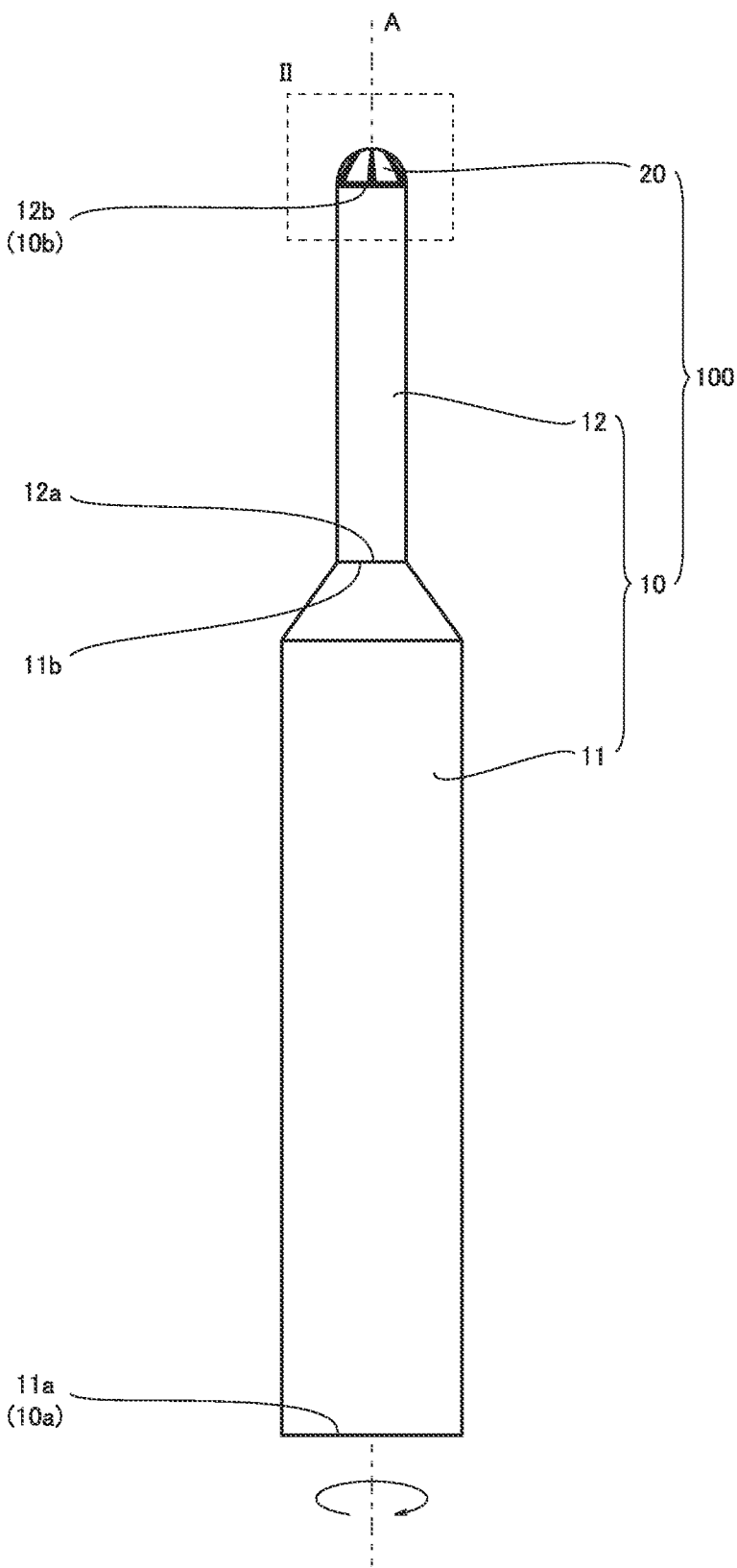
FIG. 1 is a side view of a ball end mill 100.

Problem to be Solved by the Present Disclosure

According to the findings of the present inventors, the ball end mill disclosed in PTL 1 still has room for improvement in terms of contact with a workpiece.

The present disclosure has been made in view of the above-described problem of the conventional art. More specifically, the present disclosure provides a tool improved in terms of contact with a workpiece.

Advantageous Effect of the Present Disclosure

The tool of the present disclosure allows improvement in terms of contact with a workpiece.

DESCRIPTION OF EMBODIMENTS

First, embodiments of the present disclosure will be listed for description.

(1) A tool according to an aspect of the present disclosure includes a tip end portion. The tip end portion has a surface. At least a part of the surface includes a plurality of protrusions, a first recess provided by contact between ends of two adjacent protrusions of the protrusions, and a second recess different from the first recess. The second recess is provided inside each of the protrusions or provided to extend across the two adjacent protrusions. The tool in the above (1) allows improvement in terms of contact with a workpiece.

(2) In the tool according to the above (1), a depth of the second recess may be 0.5 μm or more and 20 μm or less. In this case, the lifetime of the tool can be further improved.

(3) In the tool according to the above (1) or (2), a length of the second recess in a longitudinal direction of the second recess may be equal to or greater than a value obtained by multiplying a depth of the second recess by twice as large as a sine of an inclination angle of a side surface of the second recess, and equal to or less than 100 μm. In this case, the lifetime of the tool can be further improved.

(4) In the tool according to any one of the above (1) to (3), an inclination angle of a side surface of the second recess may be more than 0° and equal to or less than 45°. In this case, the lifetime of the tool can be further improved.

(5) In the tool according to any one of the above (1) to (4), an area ratio of the second recesses in the surface may be 3 percent or more and 80 percent or less. In this case, the lifetime of the tool can be further improved.

(6) The tool according to any one of the above (1) to (5) may be a measurement tool for measuring surface roughness or a shape of a workpiece.

(7) The tool according to any one of the above (1) to (5) may be a processing tool for processing a workpiece.

(8) In the tool according to the above (7), the surface may include a partial spherical surface. The tool may be rotated around a rotation axis to process the workpiece, the rotation axis passing through a center of the partial spherical surface.

(9) In the tool according to the above (8), a width direction of the second recess may extend in a circumferential direction around the rotation axis.

(10) In the tool according to any one of the above (7) to (9), the surface may include a groove and a cutting edge that is formed along a ridgeline between the groove and the partial spherical surface.

(11) The tool according to any one of the above (1) to (5) may be a cutting tool for cutting a workpiece. The surface may include a rake face, a flank face contiguous to the rake face, and a cutting edge formed along a ridgeline between the rake face and the flank face.

(12) In the tool according to any one of the above (7) to (11), a height of each of the protrusions may be 0.05 μm or more and 20 μm or less. In this case, the lifetime of the tool can be further improved.

(13) In the tool according to any one of the above (7) to (12), an arithmetic mean height of the surface in each of the protrusions may be 0.05 μm or more and 5 μm or less. In this case, the lifetime of the tool can be further improved.

(14) In the tool according to any one of the above (7) to (13), a skewness parameter in a portion provided with the protrusions and the first recesses in the surface may be less than 0. In this case, the lifetime of the tool can be further improved.

(15) In the tool according to any one of the above (1) to (14), the tip end portion may be formed of a nano-polycrystalline diamond.

(16) In the tool according to the above (15), the nano-polycrystalline diamond may contain atoms belonging to Group 13 or Group 15 in a long periodic table.

(17) In the tool according to any one of the above (1) to (14), the tip end portion may be formed of binderless cubic boron nitride.

(18) A method of manufacturing a tool according to an aspect of the present disclosure includes: preparing a tip end portion formed of a nano-polycrystalline diamond; and, by irradiation with laser, forming a plurality of protrusions in at least a part of a surface of the tip end portion. A first recess is provided in a part of the surface of the tip end portion by contact between ends of two adjacent protrusions of the protrusions. The method of manufacturing a tool further includes, by irradiation with laser, providing a second recess to be inside each of the protrusions or to extend across the two adjacent protrusions.

(19) The method of manufacturing a tool according to the above (18) may further include, by irradiation with laser, forming a rake face and a flank face contiguous to the rake face on the surface of the tip end portion.

Details of Embodiments of the Present Disclosure

Details of embodiments of the present disclosure will be hereinafter described with reference to the accompanying drawings, in which the same or corresponding portions are denoted by the same reference characters, and the description thereof will not be repeated.

First Embodiment

The following describes the configuration of a tool according to the first embodiment. The tool according to the first embodiment is a cutting tool for cutting a workpiece. More specifically, the tool according to the first embodiment is a ball end mill 100. The workpiece is made of a cemented carbide, for example.

Figure 2:
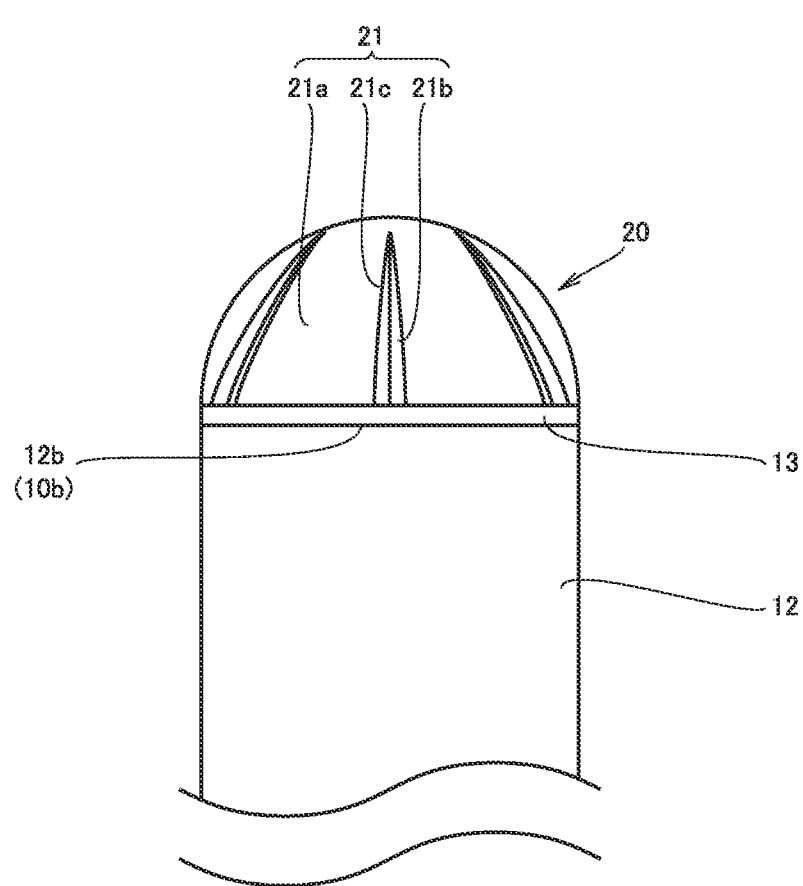
FIG. 2 is an enlarged view of a region II in FIG. 1.

FIG. 1 is a side view of ball end mill 100. FIG. 2 is an enlarged view of a region II in FIG. 1. As shown in FIGS. 1 and 2, ball end mill 100 has a rotation axis A. Ball end mill 100 is rotated around a rotation axis A to process a workpiece. Ball end mill 100 has a main body portion 10 and a tip end portion 20.

Main body portion 10 is formed of a cemented carbide, for example. Main body portion 10 has a first end 10a and a second end 10b in the direction along rotation axis A. Second end 10b is located opposite to first end 10a. Main body portion 10 has a shank 11 and a neck 12. Shank 11 is located on the first end 10a side, and neck 12 is located on the second end 10b side.

Shank 11 extends along rotation axis A. Shank 11 has a first end 11a and a second end 11b in the direction along rotation axis A. First end 11a aligns with first end 10a. Second end 11b is located opposite to first end 11a. Shank 11 has a circular shape in a cross-sectional view taken along a line orthogonal to rotation axis A.

Neck 12 extends from second end 11b along rotation axis A. Neck 12 has a first end 12a and a second end 12b in the direction along rotation axis A. First end 12a is located on the shank 11 side. Second end 12b is located opposite to first end 12a and aligns with second end 10b. Neck 12 has a circular shape in a cross-sectional view taken along a line orthogonal to rotation axis A. In a cross-sectional view taken along a line orthogonal to rotation axis A, neck 12 is smaller in cross-sectional area than shank 11.

Tip end portion 20 is attached to main body portion 10, for example, by brazing. More specifically, tip end portion 20 is attached to second end 10b with a connection layer 13 interposed therebetween. Connecting layer 13 is made of a brazing material.

Tip end portion 20 is formed of a nano-polycrystalline diamond. Such a nano-polycrystalline diamond contains a plurality of diamond crystal grains. The remainder of the nano-polycrystalline diamond may contain graphite and inevitable impurities, but does not contain a binder. In other words, in the nano-polycrystalline diamond, the diamond crystal grains are directly bonded to each other. It is more preferable that inevitable impurities are smaller in amount, but such inevitable impurities may be contained in amount of several percent with respect to the total mass.

In the nano-polycrystalline diamond, the average grain size of the diamond crystal grains is less than 1 μm. In the nano-polycrystalline diamond, the average grain size of the diamond crystal grains is preferably 10 nm or more and 500 nm or less. In the nano-polycrystalline diamond, the average grain size of the diamond crystal grains may be 100 nm or more and 500 nm or less, or may be 100 nm or more and 300 nm or less.

The average grain size of the diamond crystal grains in the nano-polycrystalline diamond can be measured in the following manner. Specifically, the surface of tip end portion 20 is precisely polished and then observed, for example, using an electron microscope such as JSM-7800F manufactured by JEOL Ltd., on the observation conditions allowing the grain boundaries to be visible, to thereby obtain a reflection electron microscope image and then analyze the obtained image. Thus, the average grain size of the diamond crystal grains can be measured.

The nano-polycrystalline diamond preferably contains atoms belonging to Group 13 or Group 15 in the long periodic table. The atoms belonging to Group 13 in the long periodic table are boron atoms, for example. The atoms belonging to Group 15 in the long periodic table are nitrogen atoms, for example. The nano-polycrystalline diamond additionally contains the atoms belonging to Group 13 or Group 15 in the long periodic table, and thus, becomes electrically conductive.

Tip end portion 20 may be formed of binderless cubic boron nitride. The binderless cubic boron nitride contains a plurality of cubic boron nitride crystal grains. The remainder of the binderless cubic boron nitride may contain boron nitride having another crystal structure (wurtzite type boron nitride, hexagonal boron nitride) and inevitable impurities, but does not contain a binder. In other words, in the binderless cubic boron nitride, the plurality of cubic boron nitride crystal grains are directly bonded to each other. It is more preferable that boron nitride having another crystal structure (wurtzite type boron nitride, hexagonal boron nitride) and inevitable impurities are smaller in amount, but such boron nitride and inevitable impurities may be contained in amount of several percent with respect to the total mass.

In the binderless cubic boron nitride, the average grain size of the cubic boron nitride crystal grains is less than 1 μm. In the binderless cubic boron nitride, the average grain size of the cubic boron nitride crystal grains is preferably 10 nm or more and 500 nm or less. In the binderless cubic boron nitride, the average grain size of the cubic boron nitride crystal grains may be 100 nm or more and 500 nm or less, or may be 100 nm or more and 300 nm or less. Note that the average grain size of the cubic boron nitride crystal grains is measured by the same method as that of measuring the average grain size of the diamond crystal grains.

Tip end portion 20 has a surface 21. Tip end portion 20 has a hemispherical shape. In other words, surface 21 includes a partial spherical surface 21a. It is assumed that a diameter R represents the diameter of the hemisphere forming tip end portion 20. When a workpiece is processed by ball end mill 100, surface 21 (partial spherical surface 21a) contacts the workpiece.

Surface 21 includes a groove 21b. Surface 21 is recessed in groove 21b. Groove 21b extends radially from the area in the vicinity of a central portion of surface 21. The ridgeline between groove 21b and partial spherical surface 21a forms a cutting edge 21c. Partial spherical surface 21a serves as a flank face. The surface of groove 21b contiguous to cutting edge 21c serves as a rake face.

Figure 3:
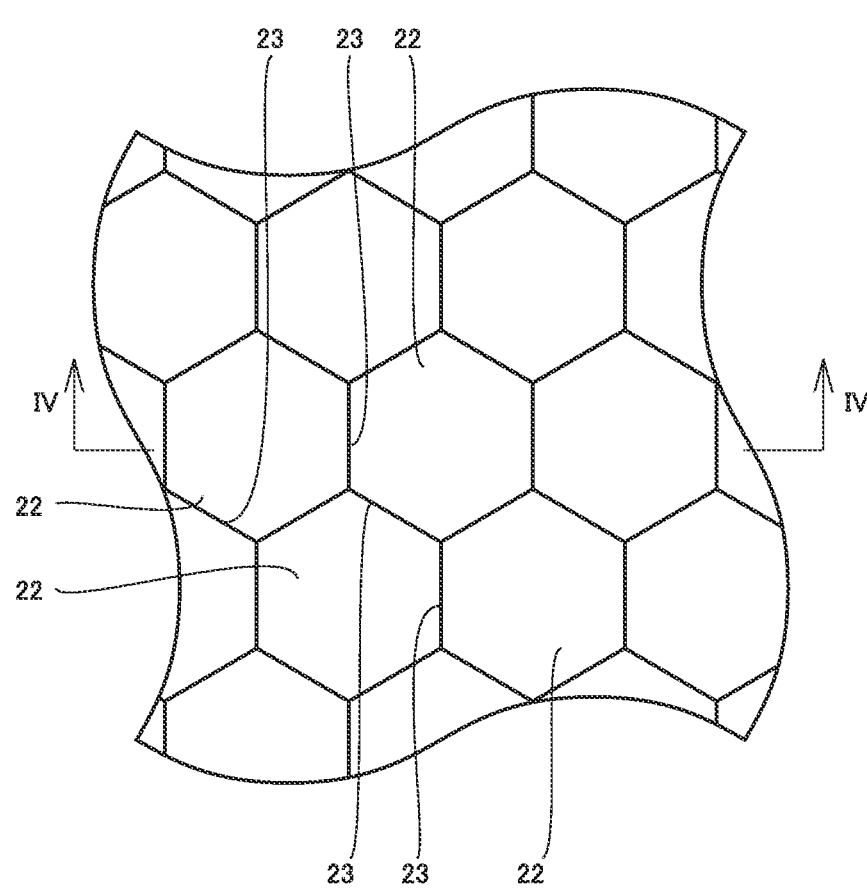
FIG. 3 is a schematic plan view of a partial spherical surface 21a of ball end mill 100.
Figure 4:
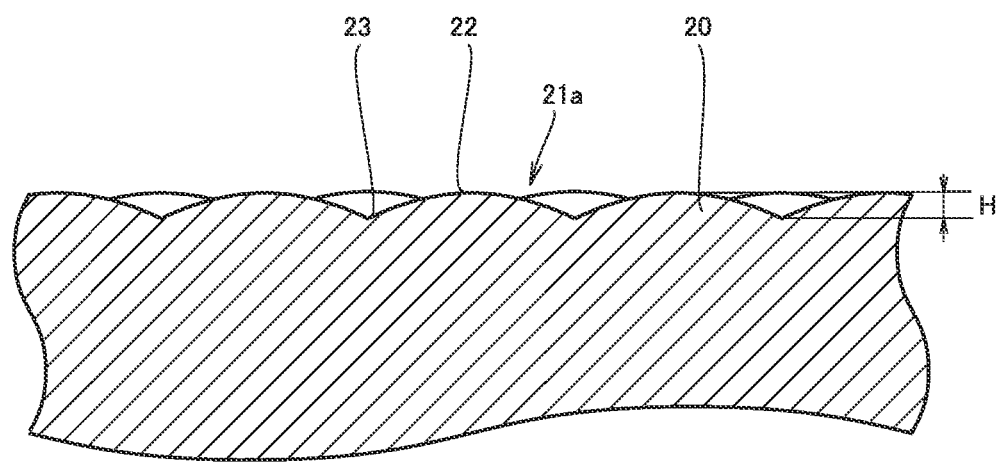
FIG. 4 is a cross-sectional view taken along a line IV-IV in FIG. 3.

FIG. 3 is a schematic plan view of partial spherical surface 21a of ball end mill 100. FIG. 4 is a cross-sectional view taken along a line IV-IV in FIG. 3. As shown in FIGS. 3 and 4, a plurality of protrusions 22 are formed on partial spherical surface 21a. Partial spherical surface 21a is recessed in each first recess 23.

In the example in FIG. 3, each protrusion 22 has a hexagonal shape in a plan view (when viewed in the direction orthogonal to partial spherical surface 21a), but the planar shape of each protrusion 22 is not limited thereto. Protrusions 22 are formed, for example, entirely over partial spherical surface 21a. Protrusions 22 may be formed only in a part of partial spherical surface 21a.

Partial spherical surface 21a is provided with a first recess 23. First recess 23 is provided by contact between ends of two adjacent protrusions 22.

Protrusion 22 has a height H. Height H represents a distance between the tip end of protrusion 22 and the bottom of first recess 23. Height H is preferably 0.05 μm or more and 20 μm or less.

The arithmetic mean height (Sa) of partial spherical surface 21a in each protrusion 22 is preferably 0.05 μm or more and 5 μm or less. The arithmetic mean height of partial spherical surface 21a in each protrusion 22 is measured according to JIS standard (JIS B 0681-2:2018).

The skewness (Ssk) at partial spherical surface 21a in the portion provided with protrusions 22 and first recesses 23 is preferably less than 0 (a negative value). The skewness at partial spherical surface 21a in the portion provided with protrusions 22 and first recesses 23 is measured according to JIS standard (JIS B 0681-2:2018).

Figure 5:
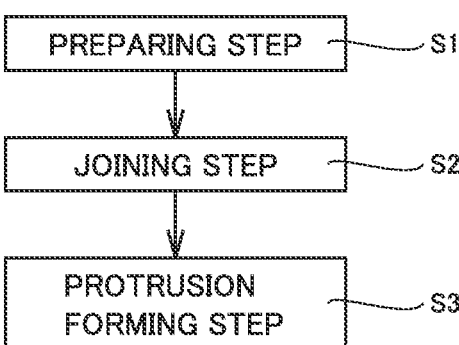
FIG. 5 is a flowchart illustrating a method of manufacturing ball end mill 100.

The following describes a method of manufacturing ball end mill 100. FIG. 5 is a flowchart illustrating the method of manufacturing ball end mill 100. As shown in FIG. 5, a preparing step S1, a joining step S2, and a protrusion forming step S3 are included.

In preparing step S1, members constituting main body portion 10 and tip end portion 20 are prepared. Note that protrusion 22 and first recess 23 are not provided on surface 21 (partial spherical surface 21a) of tip end portion 20 prepared in preparing step S1. In joining step S2, main body portion 10 and tip end portion 20 are joined, for example, by brazing.

In protrusion forming step S3, protrusion 22 is formed. Protrusion 22 is formed by irradiating surface 21 (partial spherical surface 21a) with laser. First recess 23 is provided by contact between the ends of two adjacent protrusions 22. Thus, protrusions 22 are formed in protrusion forming step S3, and thereby, each first recess 23 is also provided.

The following describes the effect of ball end mill 100.

In ball end mill 100, the ends of two protrusions 22 are in contact with each other to thereby provide first recess 23. Thus, when a workpiece is processed, swarf and the like produced from the workpiece are less likely to be restrained in first recess 23, so that welding is less likely to occur on surface 21. As a result, the contact resistance in processing a workpiece is reduced, so that the lifetime of the tool is improved.

By setting height H at 0.05 μm or more and 20 μm or less, swarf and the like produced from the workpiece are further less likely to be restrained in first recess 23, with the result that the contact resistance in processing the workpiece is further reduced, and the lifetime of the tool is further improved.

When the skewness at partial spherical surface 21a in the portion provided with protrusions 22 and first recesses 23 is less than 0, swarf and the like produced from the workpiece are further less likely to be restrained in each first recess 23, with the result that the contact resistance in processing the workpiece is further reduced, and the lifetime of the tool is further improved.

The smaller arithmetic mean height of partial spherical surface 21a in each protrusion 22 is less likely to cause welding in each protrusion 22. Thus, by setting the arithmetic mean height in each protrusion 22 at 0.05 μm or more and 5 μm or less, the contact resistance in processing the workpiece is further reduced, and the lifetime of the tool is further improved.

Second Embodiment

Hereinafter, the configuration of a tool according to the second embodiment will be described. The tool according to the second embodiment is a processing tool for processing a workpiece. More specifically, the tool according to the second embodiment is a ball end mill 200. The following mainly describes the differences from the configuration of ball end mill 100, but the same description will not be repeated.

Ball end mill 200 has a main body portion 10 and a tip end portion 20. Main body portion 10 has a shank 11 and a neck 12. Tip end portion 20 has a surface 21. Surface 21 includes a partial spherical surface 21*a*. Partial spherical surface 21*a* is provided with a protrusion 22 and a first recess 23. As to these points, ball end mill 200 and ball end mill 100 are identical in configuration.

Figure 6:
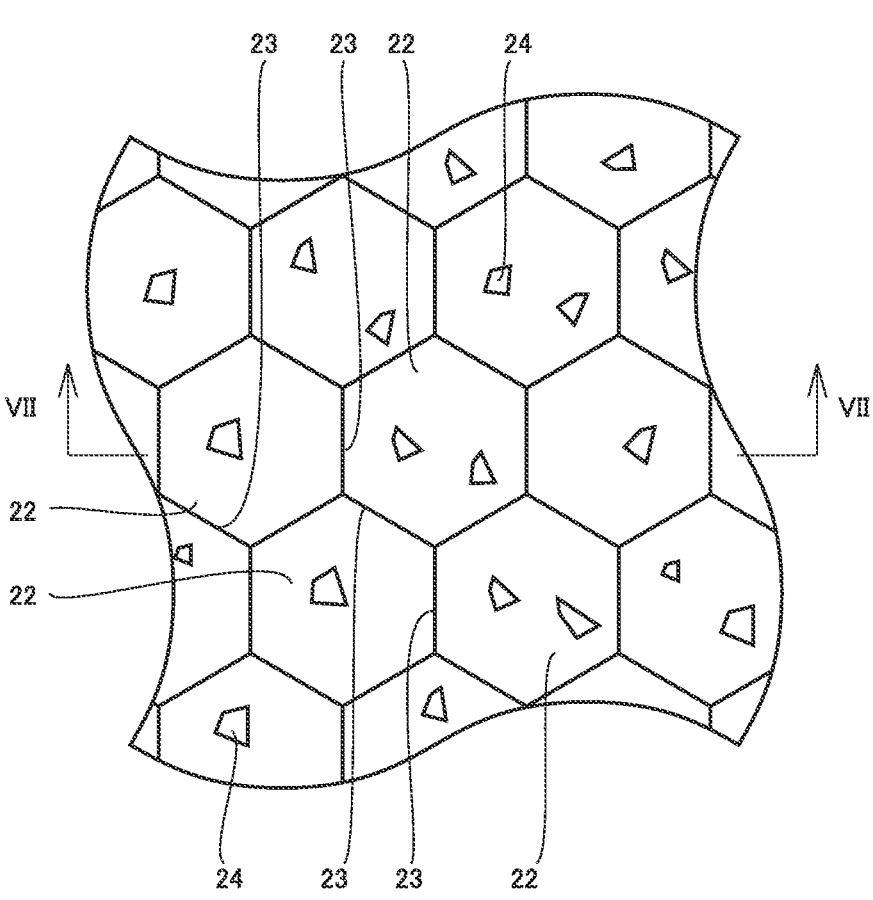
FIG. 6 is a schematic plan view of a partial spherical surface 21a of a ball end mill 200.
Figure 7:
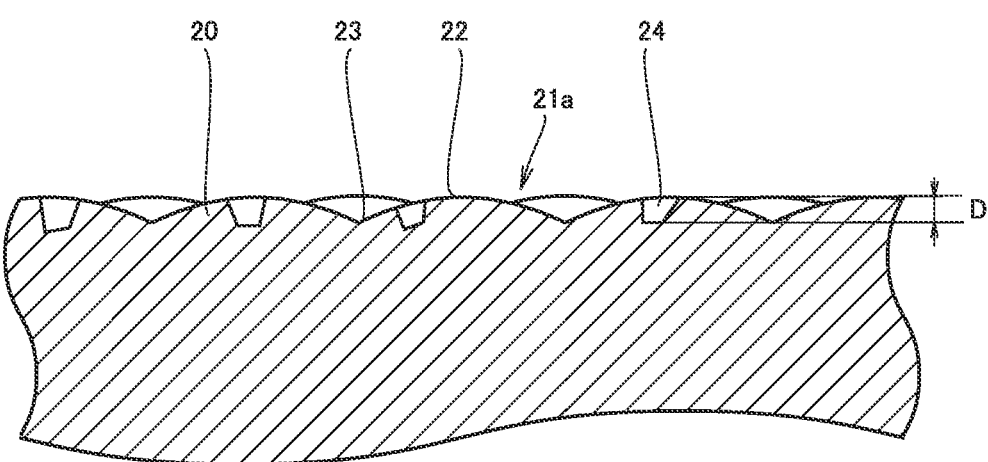
FIG. 7 is a cross-sectional view taken along a line VII-VII in FIG. 6.

FIG. 6 is a schematic plan view of partial spherical surface 21*a* of ball end mill 200. FIG. 7 is a cross-sectional view taken along a line VII-VII in FIG. 6. Partial spherical surface 21*a* is further provided with second recesses 24 as shown in FIGS. 6 and 7. As to these points, ball end mill 200 is different in configuration from ball end mill 100.

Second recess 24 is different from first recess 23. In second recess 24, partial spherical surface 21*a* is recessed. Second recess 24 is provided, for example, inside protrusion 22. It is assumed that a depth D represents the depth of second recess 24. Depth D is 1.0 μm or more. Depth D is 20 μm or less, for example.

The equivalent circle diameter of each second recess 24 in a plan view is preferably 0.5 μm or more and 50 μm or less. The equivalent circle diameter of each second recess 24 in a plan view is represented by a square root of the value obtained by dividing the area of each second recess 24 in a plan view by π/4. The area ratio of second recesses 24 in surface 21 is preferably 3 percent or more and 80 percent or less. The area ratio of second recesses 24 in surface 21 is represented by a value obtained by dividing the area of surface 21 provided with second recesses 24 by the area of surface 21 provided with protrusions 22 and first recesses 23.

Hereinafter, a method of manufacturing ball end mill 200 will be described. The following mainly describes the differences from the method of manufacturing ball end mill 100, but the same description will not be repeated.

Figure 8:
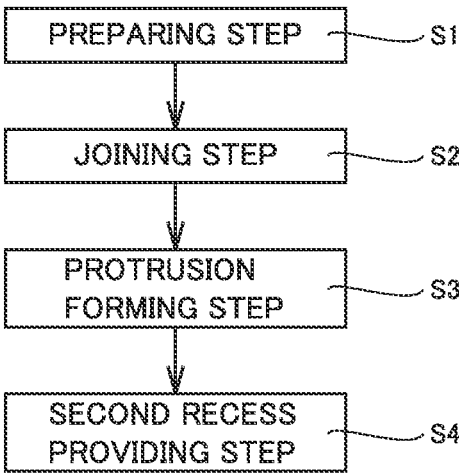
FIG. 8 is a flowchart illustrating a method of manufacturing ball end mill 200.

FIG. 8 is a flowchart illustrating a method of manufacturing ball end mill 200. As shown in FIG. 8, the method of manufacturing ball end mill 200 includes a preparing step S1, a joining step S2, and a protrusion forming step S3. In this regard, the method of manufacturing ball end mill 200 is in common with the method of manufacturing ball end mill 100.

The method of manufacturing ball end mill 200 further includes a second recess providing step S4. In this regard, the method of manufacturing ball end mill 200 is different from the method of manufacturing ball end mill 100.

In second recess providing step S4, second recess 24 is provided. In providing second recess 24, firstly, metal powder is placed on surface 21 (partial spherical surface 21*a*). Metal (for example, iron, cobalt, or nickel) having a high affinity for diamond is selected as such metal powder.

Secondly, surface 21 is heated to cause the above-mentioned metal powder to react with diamonds contained in tip end portion 20. As a result, the diamonds are removed from surface 21 of the portion to which the above-mentioned metal powder adheres, so that each second recess 24 is provided.

As apparent from the above-described method of providing second recess 24, the equivalent circle diameter of each second recess 24 can be changed by adjusting the grain size of the grains of the above-mentioned metal powder to be placed, and the area ratio of second recesses 24 can be changed by adjusting the amount of the above-mentioned metal powder to be placed. Note that the method of providing second recess 24 is not limited to the above-mentioned example. Second recess 24 may be provided, for example, by irradiating surface 21 (partial spherical surface 21*a*) with laser.

Hereinafter, the effects of ball end mill 200 will be described. The following mainly describes the differences from the effects of ball end mill 100, but the same description will not be repeated.

In ball end mill 200, second recess 24 and cutting edge 21*c* simultaneously act as cutting edges. Such a combination of larger and smaller cutting edges provides a cutting effect as if it is achieved in processing by grinding. Thus, ball end mill 200 can improve the accuracy in processing a workpiece.

Further, when depth D is less than 1.0 μm, swarf and the like produced from the workpiece get clogged in second recess 24, which tends to turn into a starting point of welding. As a result, the contact resistance in processing the workpiece is increased, so that wearing away of surface 21 (partial spherical surface 21*a*) is more likely to progress. In this way, according to ball end mill 200 provided with second recesses 24 each having depth D of 1.0 μm or more, the accuracy in processing the workpiece can be improved while ensuring the lifetime of the tool.

When the equivalent circle diameter of each second recess 24 in a plan view is excessively large, such an excessively large equivalent circle diameter makes it difficult for each second recess 24 to act as a cutting edge. Further, when the equivalent circle diameter of each second recess 24 in a plan view is excessively small, swarf and the like is more likely to get clogged in each second recess 24. Thus, the equivalent circle diameter of each second recess 24 in a plan view is set at 0.5 μm or more and 50 μm or less, and thereby, the lifetime of the tool can be further improved.

When the area ratio of second recesses 24 is excessively small, the number of second recesses 24 functioning as cutting edges is relatively small. On the other hand, when the area ratio of second recesses 24 is excessively large, the ratio of second recesses 24 functioning as cutting edges decreases, and the load per cutting edge (second recess 24) increases, so that wearing away of surface 21 (partial spherical surface 21*a*) is more likely to progress. Therefore, by setting the area ratio of second recesses 24 at 3 percent or more and 80 percent or less, the lifetime of the tool can be further improved.

<First Cutting Test>

The first cutting test was conducted in order to check the influences of the skewness at surface 21, the height (height H) of protrusion 22, the arithmetic mean height in each protrusion 22, the depth (depth D) of second recess 24, the equivalent circle diameter of each second recess 24 in a plan view, and the area ratio of second recesses 24. The following describes this cutting test.

In the first cutting test, Samples 1-1 to 1-11 each were used as ball end mill 200. In each of Samples 1-1 to 1-11, the skewness at surface 21, height H, the arithmetic mean height in each protrusion 22, depth D, the equivalent circle diameter of each second recess 24 in a plan view, and the area ratio of second recesses 24 were changed as shown in Table 1. In each of Samples 1-1 to 1-11, diameter R was set at 1.0 mm. Also, in each of Samples 1-1 to 1-11, tip end portion 20 was formed of a nano-polycrystalline diamond.

TABLE 1

| | | | Second Recess 24 | | |
|---|---|---|---|---|---|
| | Height H (μm) | Sa in Protrusion 22 (μm) | Depth D (μm) | Equivalent Circle Diameter (μm) | Area Raito (%) |
| Ssk at Surface 21 | | | | | |
| Sample 1-1 | −0.5 | 1.0 | 0.2 | 31.0 | 42.1 | 35.2 |
| Sample 1-2 | −0.2 | 2.8 | 0.6 | 20.8 | 34.1 | 10.2 |
| Sample 1-3 | −0.4 | 8.6 | 1.7 | 47.2 | 1.4 | 51.2 |
| Sample 1-4 | −0.5 | 10.9 | 2.4 | 83.5 | 7.2 | 72.0 |
| Sample 1-5 | −0.3 | 14.8 | 3.6 | 1.8 | 28.7 | 23.4 |
| Sample 1-6 | −0.1 | 17.5 | 3.9 | 5.4 | 3.9 | 6.1 |
| Sample 1-7 | +0.2 | 19.7 | 4.0 | 43.8 | 3.6 | 42.0 |
| Sample 1-8 | −0.3 | 45.1 | 9.7 | 7.6 | 33.4 | 27.5 |
| Sample 1-9 | −0.1 | 9.9 | 2.0 | 0.4 | 15.8 | 29.7 |
| Sample 1-10 | −0.2 | 12.0 | 2.6 | 4.5 | 62.8 | 78.3 |
| Sample 1-11 | −0.4 | 4.4 | 1.0 | 25.4 | 18.8 | 95.2 |

The first cutting test was conducted on the conditions of a rotation speed of ball end mill 200 of 30000 rpm, a tool feed rate of 400 mm/min, an amount of cut of 0.005 mm, and a width of cut of 0.002 mm. The first cutting test was conducted by dry processing without supplying a coolant. The workpiece used in the first cutting test was a cemented carbide AF1 manufactured by Sumitomo Electric Industries, Ltd. In the first cutting test, the lifetime of the tool of each of Samples 1-1 to 1-11 was evaluated based on the cutting distance obtained until the point when the arithmetic mean roughness of the workpiece on the processed surface reached 0.05 μm or more. Table 2 shows the results of the first cutting test.

TABLE 2

| | Lifetime of Tool (m) |
|---|---|
| Sample 1-1 | 82 |
| Sample 1-2 | 88 |
| Sample 1-3 | 65 |
| Sample 1-4 | 85 |
| Sample 1-5 | 97 |
| Sample 1-6 | 80 |
| Sample 1-7 | 33 |
| Sample 1-8 | 14 |
| Sample 1-9 | 30 |
| Sample 1-10 | 19 |
| Sample 1-11 | 38 |

Samples 1-1 to 1-6 each were longer in lifetime of the tool than Sample 1-7. The skewness at surface 21 of each of Samples 1-1 to 1-6 was less than 0. The skewness at surface 21 of Sample 1-7 was a positive value. The above-mentioned comparison empirically showed that the lifetime of the tool of ball end mill 200 was improved when the skewness at surface 21 was less than 0.

Samples 1-1 to 1-6 each were longer in lifetime of the tool than Sample 1-8. Height H of each of Samples 1-1 to 1-6 fell within the range of 0.05 μm or more and 20 μm or less. Height H of Sample 1-8 fell outside the range of 0.05 μm or more and 20 μm or less. The arithmetic mean height in each protrusion 22 of each of Samples 1-1 to 1-6 fell within the range of 0.05 μm or more and 5 μm or less. The arithmetic mean height in each protrusion 22 of Sample 1-8 fell outside the range of 0.05 μm or more and 5 μm or less.

The above-mentioned comparison empirically showed that the lifetime of the tool of ball end mill 200 was improved when height H fell within the range of 0.05 μm or more and 20 μm or less and the arithmetic mean height in each protrusion 22 fell within the range of 0.05 μm or more and 5 μm or less.

Samples 1-1 to 1-6 each were longer in lifetime of the tool than Sample 1-9. Depth D of each of Samples 1-1 and 1-6 was 1.0 μm or more. Depth D of Sample 1-9 was less than 1.0 μm. The above-mentioned comparison empirically showed that the lifetime of the tool of ball end mill 200 was improved when depth D was 1.0 μm or more.

Samples 1-1 to 1-6 each were longer in lifetime of the tool than Sample 1-10. The equivalent circle diameter of each second recess 24 of each of Samples 1-1 to 1-6 fell within the range of 0.5 μm or more and 50 μm or less. The equivalent circle diameter of each second recess 24 of Sample 1-10 fell outside the range of 0.5 μm or more and 50 μm or less. The above-mentioned comparison empirically showed that the lifetime of the tool of ball end mill 200 was improved when the equivalent circle diameter of each second recess 24 was 0.5 μm or more and 50 μm or less.

Samples 1-1 to 1-6 each were longer in lifetime of the tool than Sample 1-11. The area ratio of second recesses 24 in surface 21 of each of Samples 1-1 to 1-6 fell within the range of 3 percent or more and 80 percent or less. The area ratio of second recesses 24 in surface 21 of Sample 1-11 fell outside the range of 3 percent or more and 80 percent or less. The above-mentioned comparison empirically showed that the lifetime of the tool of ball end mill 200 was improved when the area ratio of second recesses 24 in surface 21 was 3 percent or more and 80 percent or less.

<Second Cutting Test>

The second cutting test was conducted in order to check the influences of the skewness at surface 21, the height (height H) of protrusion 22, the arithmetic mean height in each protrusion 22, the depth (depth D) of each second recess 24, the equivalent circle diameter of each second recess 24 in a plan view, and the area ratio of second recesses 24. The following describes this second cutting test.

In the second cutting test, Samples 2-1 to 2-11 each were used as ball end mill 200. In Samples 2-1 to 2-11, the skewness at surface 21, height H, the arithmetic mean height in each protrusion 22, depth D, the equivalent circle diameter of each second recess 24 in a plan view, and the area ratio of second recesses 24 were changed as shown in Table 3. Samples 2-1 to 2-11 each had a diameter R of 3.0 mm. In each of Samples 2-1 to 2-11, tip end portion 20 was formed of a nano-polycrystalline diamond containing atoms belonging to Group 13 or Group 15 in the long periodic table.

TABLE 3

| | | | Second Recess 24 | | |
| --- | --- | --- | --- | --- | --- |
| | | Sa in | | Equivalent Circle | |
| | Ssk at Surface 21 | Height H (μm) | Protrusion 22 (μm) | Depth D (μm) | Diameter (μm) | Area Raito (%) |
| Sample 2-1 | −0.1 | 0.8 | 0.2 | 10.0 | 17.2 | 47.5 |
| Sample 2-2 | −0.4 | 2.6 | 0.5 | 96.3 | 26.7 | 21.7 |
| Sample 2-3 | −0.2 | 7.3 | 1.5 | 20.5 | 42.7 | 70.7 |
| Sample 2-4 | −0.5 | 11.2 | 2.3 | 16.3 | 34.6 | 30.8 |
| Sample 2-5 | −0.1 | 14.9 | 3.1 | 2.2 | 12.0 | 4.7 |
| Sample 2-6 | −0.5 | 18.7 | 4.2 | 54.8 | 3.1 | 51.8 |
| Sample 2-7 | +0.2 | 14.8 | 3.1 | 58.8 | 16.2 | 32.8 |
| Sample 2-8 | −0.2 | 36.0 | 8.3 | 34.3 | 5.5 | 23.6 |
| Sample 2-9 | −0.1 | 19.6 | 4.8 | 0.2 | 2.5 | 31.6 |
| Sample 2-10 | −0.1 | 11.9 | 3.0 | 7.7 | 68.1 | 74.9 |
| Sample 2-11 | −0.1 | 7.3 | 1.5 | 3.5 | 47.1 | 87.5 |

The second cutting test was conducted on the conditions of a rotation speed of ball end mill 200 of 10000 rpm, a tool feed rate of 100 mm/min, an amount of cut of 0.015 mm, and a width of cut of 0.02 mm. The second cutting test was conducted while supplying a water-soluble coolant. The work-piece used in the second cutting test was quartz glass. In the second cutting test, the lifetime of the tool of each of Samples 2-1 to 2-11 was evaluated based on the cutting distance obtained until the point when the amount of wear on the flank face (partial spherical surface 21a) reached 50 μm or more. Table 4 shows the results of the second cutting test.

TABLE 4

| | Lifetime of Tool (m) |
| --- | --- |
| Sample 2-1 | 95 |
| Sample 2-2 | 84 |
| Sample 2-3 | 78 |
| Sample 2-4 | 82 |
| Sample 2-5 | 100 |
| Sample 2-6 | 93 |
| Sample 2-7 | 28 |
| Sample 2-8 | 32 |
| Sample 2-9 | 22 |
| Sample 2-10 | 21 |
| Sample 2-11 | 11 |

Samples 2-1 to 2-6 each were longer in lifetime of the tool than Sample 2-7. The skewness at surface 21 of each of Samples 2-1 to 2-6 was less than 0. The skewness at surface 21 of Sample 2-7 was a positive value. The above-mentioned comparison empirically showed that the lifetime of the tool of ball end mill 200 was improved when the skewness at surface 21 was less than 0.

Samples 2-1 to 2-6 each were longer in lifetime of the tool than Sample 2-8. Height H of each of Samples 2-1 to 2-6 fell within the range of 0.05 μm or more and 20 μm or less. Height H of Sample 2-8 fell outside the range of 0.05 μm or more and 20 μm or less. The arithmetic mean height in each protrusion 22 of each of Samples 2-1 to 2-6 fell within the range of 0.05 μm or more and 5 μm or less. The arithmetic mean height in each protrusion 22 of Sample 2-8 fell outside the range of 0.05 μm or more and 5 μm or less.

The above-mentioned comparison empirically showed that the lifetime of the tool of ball end mill 200 was improved when height H fell within the range of 0.05 μm or more and 20 μm or less, and the arithmetic mean height in each protrusion 22 fell within the range of 0.05 μm or more and 5 μm or less.

Samples 2-1 to 2-6 each were longer in lifetime of the tool than Sample 2-9. Depth D of each of Samples 2-1 to 2-6 was 1.0 μm or more. Depth D of Sample 2-9 was less than 1.0 μm. The above-mentioned comparison empirically showed that the lifetime of the tool of ball end mill 200 was improved when depth D was 1.0 μm or more.

Samples 2-1 to 2-6 each were longer in lifetime of the tool than Sample 2-10. The equivalent circle diameter of each second recess 24 of each of Samples 2-1 to 2-6 fell within the range of 0.5 μm or more and 50 μm or less. The equivalent circle diameter of each second recess 24 of Sample 2-10 fell outside the range of 0.5 μm or more and 50 μm or less. The above-mentioned comparison empirically showed that the lifetime of the tool of ball end mill 200 was improved when the equivalent circle diameter of each second recess 24 was 0.5 μm or more and 50 μm or less.

Samples 2-1 to 2-6 each were longer in lifetime of the tool than Sample 2-11. The area ratio of second recesses 24 in surface 21 of each of Samples 2-1 to 2-6 fell within the range of 3 percent or more and 80 percent or less. The area ratio of second recesses 24 in surface 21 of sample 2-11 fell outside the range of 3 percent or more and 80 percent or less. The above-mentioned comparison empirically showed that the lifetime of the tool of ball end mill 200 was improved when the area ratio of second recesses 24 in surface 21 was 3 percent or more and 80 percent or less.

<Modifications>

Hereinafter, the configuration of a modification of ball end mill 200 (hereinafter referred to as a "ball end mill 200A") will be described. The following mainly describes the differences from the configuration of ball end mill 200, but the same description will not be repeated.

Figure 9:
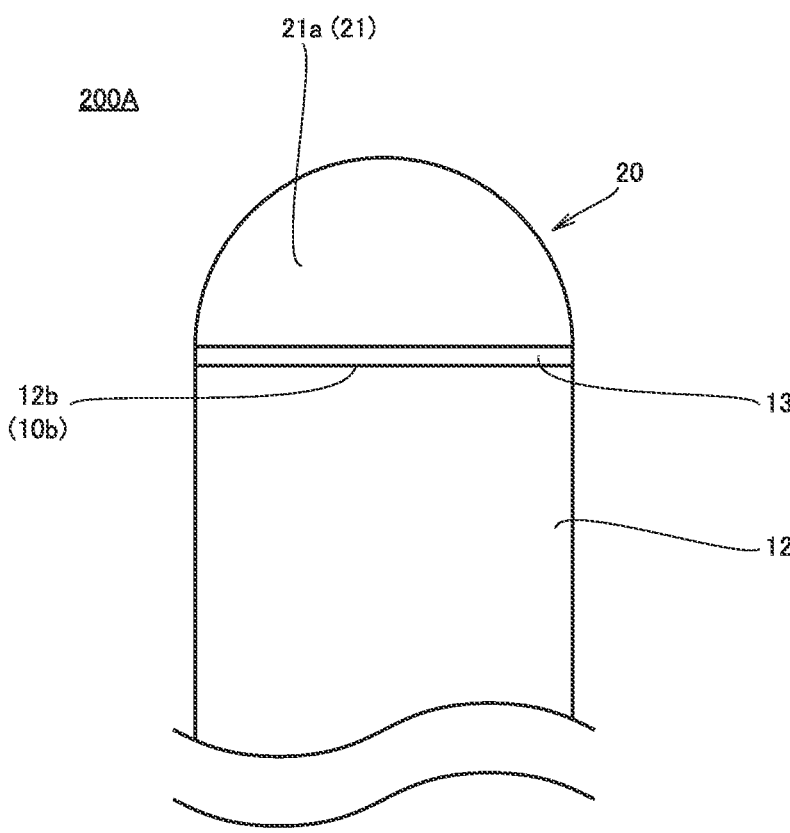
FIG. 9 is an enlarged side view showing a tip end portion 20 of a ball end mill 200A and the vicinity thereof.

FIG. 9 is an enlarged side view showing a tip end portion 20 of ball end mill 200A and the vicinity thereof. As shown in FIG. 9, groove 21b and cutting edge 21c are not provided on a surface 21 of ball end mill 200A. However, as described above, second recess 24 acts as a minute cutting edge. Accordingly, ball end mill 200A can process a workpiece without including cutting edge 21c.

Third Embodiment

The following describes the configuration of a tool according to the third embodiment. The tool according to the third embodiment is a cutting tool for cutting a workpiece. More specifically, the tool according to the third embodiment is a cutting insert 300.

Figure 10:
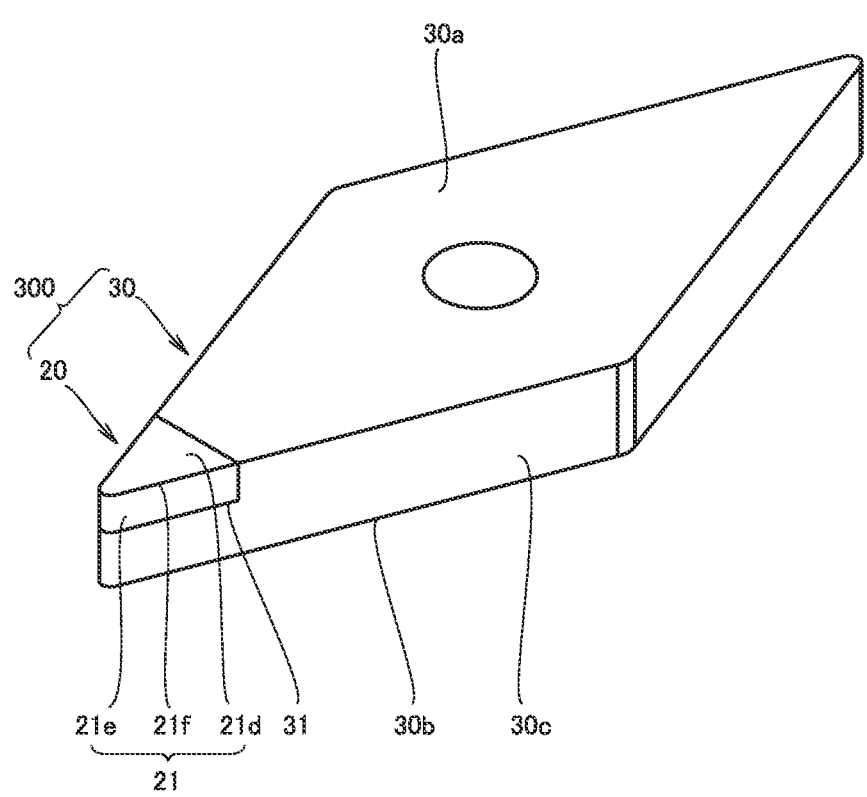
FIG. 10 is a perspective view of a cutting insert 300.
Figure 11:
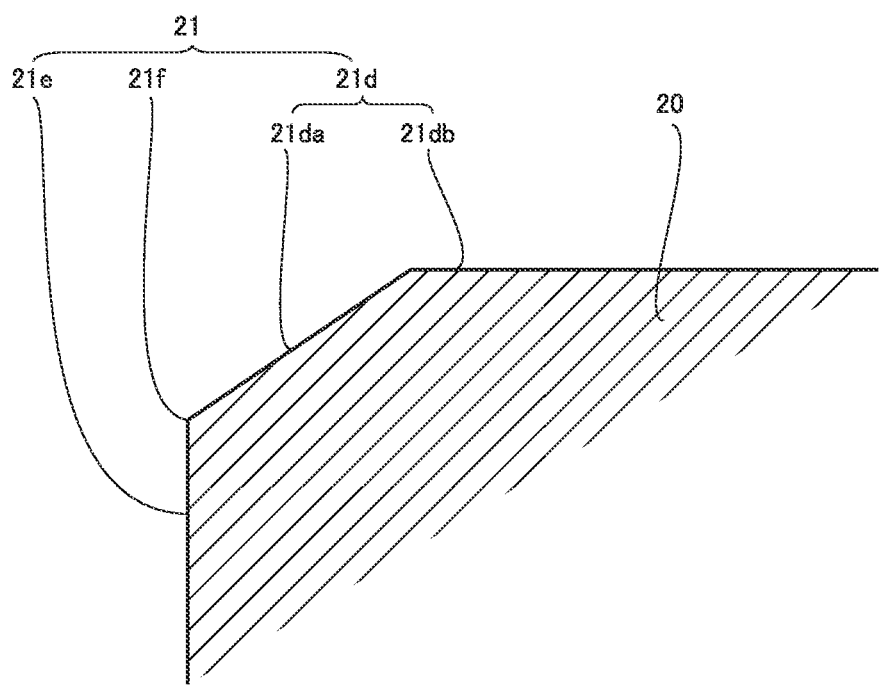
FIG. 11 is a cross-sectional view of a tip end portion 20 of cutting insert 300.

FIG. 10 is a perspective view of cutting insert 300. FIG. 11 is a cross-sectional view of a tip end portion 20 of cutting insert 300. As shown in FIGS. 10 and 11, cutting insert 300 has a base body 30 and a tip end portion 20.

Base body 30 has a first surface 30a, a second surface 30b, and a side surface 30c. Second surface 30b is located opposite to first surface 30a. Side surface 30c is contiguous to first surface 30a and second surface 30b. Base body 30 has an attachment portion 31. Attachment portion 31 is located at a corner portion of base body 30 when viewed in the direction orthogonal to first surface 30a.

The distance between first surface 30a and second surface 30b located in attachment portion 31 is smaller than the distance between first surface 30a and second surface 30b located at positions other than the position of attachment portion 31. In other words, attachment portion 31 is provided with a stepped portion on the first surface 30a side of base body 30. Base body 30 is formed of a cemented carbide, for example.

Tip end portion 20 is attached to attachment portion 31 by brazing or the like. Surface 21 of tip end portion 20 has a rake face 21d, a flank face 21e, and a cutting edge 21f. Rake face 21d is contiguous to flank face 21e. Rake face 21d is contiguous to first surface 30a on the side opposite to flank face 21e. Flank face 21e is contiguous to side surface 30c on the side opposite to rake face 21d. Cutting edge 21f is formed along a ridgeline between rake face 21d and flank face 21e.

Rake face 21d has a first portion 21da and a second portion 21db. First portion 21da is a portion of rake face 21d that is contiguous to flank face 21e. Second portion 21db is located across first portion 21da from cutting edge 21f.

First portion 21da is inclined with respect to second portion 21db so as to form a negative angle with respect to second portion 21db. The state where first portion 21da forms a negative angle with respect to second portion 21db means the state where first portion 21da is rotated counterclockwise with respect to second portion 21db when second portion 21db faces upward and flank face 21e faces leftward. In a different perspective, first portion 21da is a negative land.

Protrusion 22 and first recess 23 are provided in each of rake face 21d and flank face 21e. More specifically, protrusion 22 and first recess 23 are provided in each of first portion 21da and flank face 21e. Rake face 21d (first portion 21da) and flank face 21e may be further provided with second recess 24.

The following describes a method of manufacturing cutting insert 300.

Figure 12:
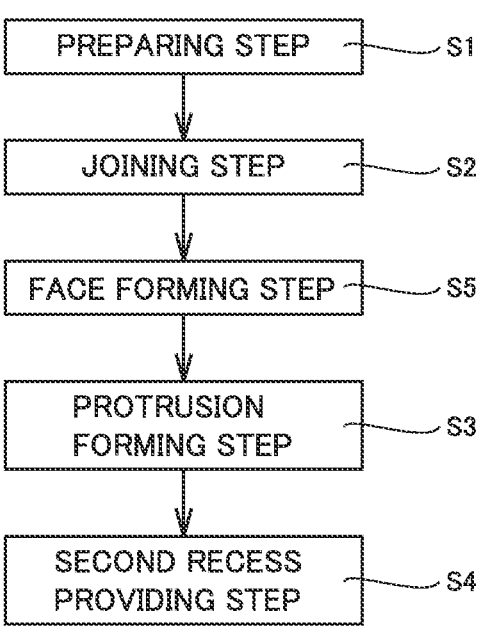
FIG. 12 is a flowchart illustrating a method of manufacturing cutting insert 300.

FIG. 12 is a flowchart illustrating a method of manufacturing cutting insert 300. As shown in FIG. 12, the method of manufacturing cutting insert 300 includes a preparing step S1, a joining step S2, a face forming step S5, and a protrusion forming step S3. The method of manufacturing cutting insert 300 may further include a second recess providing step S4.

In preparing step S1, members constituting base body 30 and tip end portion 20 are prepared. Protrusion 22 and first recess 23 are not provided in surface 21 of tip end portion 20 prepared in preparing step S1. In joining step S2, base body 30 and tip end portion 20 are joined, for example, by brazing.

In face forming step S5, rake face 21d and flank face 21e are formed on surface 21. Rake face 21d and flank face 21e each are formed, for example, by irradiating surface 21 with laser. In face forming step S5, formation of rake face 21d and flank face 21e also leads to formation of cutting edge 21f. Since protrusion forming step S3 and second recess providing step S4 are as described above, the description thereof will not be repeated.

The following describes the effect of cutting insert 300.

When a workpiece is processed by cutting insert 300, swarf and the like produced from the workpiece are less likely to be restrained in first recess 23, so that welding is less likely to occur on surface 21. Consequently, the contact resistance occurring in processing the workpiece can be reduced, with the result that the lifetime of the tool can be improved.

Further, when the workpiece is processed by cutting insert 300, not only cutting edge 21f cuts the workpiece, but also second recess 24 provided in flank face 21e acts as a minute cutting edge to grind the workpiece, and therefore, the processing quality of the workpiece surface (the surface roughness of the workpiece surface) is improved.

In this way, cutting insert 300 can improve the accuracy in processing the workpiece.

<Cutting Test>

A cutting test was conducted in order to check the influences of the skewness at surface 21, the height (height H) of protrusion 22, the arithmetic mean height in each protrusion 22, the depth (depth D) of second recess 24, the equivalent circle diameter of each second recess 24 in a plan view, and the area ratio of second recesses 24. The following describes this cutting test.

In the cutting test, Samples 3-1 to 3-11 each were used as cutting insert 300. In each of Samples 3-1 to 3-11, the skewness at surface 21, height H, the arithmetic mean height in each protrusion 22, depth D, the equivalent circle diameter of each second recess 24 in a plan view, and the area ratio of second recesses 24 were changed as shown in Table 5. In each of Samples 3-1 to 3-11, tip end portion 20 was formed of binderless cubic boron nitride.

TABLE 5

| | | | | Second Recess 24 | | |
| | Ssk at Surface 21 | Height H (μm) | Sa in Protrusion 22 (μm) | Depth D (μm) | Equivalent Circle Diameter (μm) | Area Raito (%) |
|---|---|---|---|---|---|---|
| Sample 3-1 | −0.5 | 0.5 | 0.1 | 16.3 | 37.4 | 31.8 |
| Sample 3-2 | −0.1 | 3.1 | 0.7 | 27.6 | 5.2 | 14.1 |
| Sample 3-3 | −0.4 | 6.6 | 1.3 | 1.3 | 47.6 | 7.2 |
| Sample 3-4 | −0.4 | 11.5 | 2.4 | 44.9 | 18.7 | 58.3 |
| Sample 3-5 | −0.4 | 15.2 | 3.3 | 19.5 | 25.0 | 74.1 |
| Sample 3-6 | −0.5 | 17.9 | 3.9 | 82.6 | 14.2 | 19.6 |
| Sample 3-7 | +0.5 | 4.9 | 1.1 | 10.7 | 15.2 | 17.2 |
| Sample 3-8 | −0.2 | 42.3 | 8.6 | 40.8 | 4.4 | 22.2 |

TABLE 5-continued

| | | | Second Recess 24 | | |
|---|---|---|---|---|---|
| | | Sa in | | Equivalent Circle | |
| Ssk at Surface 21 | Height H (μm) | Protrusion 22 (μm) | Depth D (μm) | Diameter (μm) | Area Raito (%) |
| Sample 3-9 | −0.4 | 11.3 | 2.6 | 0.3 | 44.9 | 9.7 |
| Sample 3-10 | −0.2 | 0.9 | 0.2 | 23.1 | 66.1 | 18.7 |
| Sample 3-11 | −0.2 | 4.3 | 1.0 | 8.7 | 13.1 | 86.0 |

In the cutting test, a round bar-shaped workpiece made of a titanium-6 aluminum-4 vanadium alloy was subjected to turning using each of Samples 3-1 to 3-9. The cutting test was conducted on the conditions of a cutting speed of 250 m/min, an amount of feed of 0.2 mm/rotation, and an amount of cut of 0.5 mm. In the cutting test, a coolant was supplied at a pressure of 7 MPa. The lifetime of the tool of each of Samples 3-1 to 3-11 was evaluated based on the cutting distance obtained until the point when the amount of wear on flank face 21e reached 150 m or more. Table 6 shows the results of the cutting test.

TABLE 6

| | Lifetime of Tool (km) |
|---|---|
| Sample 3-1 | 12 |
| Sample 3-2 | 17 |
| Sample 3-3 | 19 |
| Sample 3-4 | 18 |
| Sample 3-5 | 14 |
| Sample 3-6 | 17 |
| Sample 3-7 | 6 |
| Sample 3-8 | 2 |
| Sample 3-9 | 5 |
| Sample 3-10 | 2 |
| Sample 3-11 | 6 |

Samples 3-1 to 3-6 each were longer in lifetime of the tool than Sample 3-7. The skewness at surface 21 of each of Samples 3-1 to 3-6 was less than 0. On the other hand, the skewness at surface 21 of Sample 3-7 was a positive value. The above-mentioned comparison empirically showed that the lifetime of the tool of cutting insert 300 was improved when the skewness at surface 21 was less than 0.

Samples 3-1 to 3-6 each were longer in lifetime of the tool than Sample 3-8. Height H of each of Samples 3-1 to 3-6 fell within the range of 0.05 μm or more and 20 μm or less. Height H of Sample 3-8 fell outside the range of 0.05 μm or more and 20 μm or less. The arithmetic mean height in each protrusion 22 of each of Samples 3-1 to 3-6 fell within the range of 0.05 μm or more and 5 μm or less. The arithmetic mean height in each protrusion 22 of Sample 3-8 fell outside the range of 0.05 μm or more and 5 μm or less.

The above-mentioned comparison empirically showed that the lifetime of the tool of cutting insert 300 was improved when height H fell within the range of 0.05 μm or more and 20 μm or less, and the arithmetic mean height in each protrusion 22 fell within the range of 0.05 μm or more and 5 μm or less.

Samples 3-1 to 3-6 each were longer in lifetime of the tool than Sample 3-9. Depth D of each of Samples 3-1 to 3-6 was 1.0 μm or more. Depth D of Sample 3-9 was less than 1.0 μm. The above-mentioned comparison empirically showed that the lifetime of the tool of cutting insert 300 was improved when depth D was 1.0 μm or more.

Samples 3-1 to 3-6 each were longer in lifetime of the tool than Sample 3-10. The equivalent circle diameter of each second recess 24 of each of Samples 3-1 to 3-6 fell within the range of 0.5 μm or more and 50 m or less. The equivalent circle diameter of each second recess 24 of Sample 3-10 fell outside the range of 0.5 μm or more and 50 μm or less. The above-mentioned comparison empirically showed that the lifetime of the tool of cutting insert 300 was improved when the equivalent circle diameter of each second recess 24 was 0.5 m or more and 50 μm or less.

Samples 3-1 to 3-6 each were longer in lifetime of the tool than Sample 3-11. The area ratio of second recesses 24 in surface 21 of each of Samples 3-1 to 3-6 fell within the range of 3 percent or more and 80 percent or less. On the other hand, the area ratio of second recesses 24 in surface 21 of Sample 3-11 fell outside the range of 3 percent or more and 80 percent or less. The above-mentioned comparison empirically showed that the lifetime of the tool of cutting insert 300 was improved when the area ratio of second recesses 24 in surface 21 was 3 percent or more and 80 percent or less.

<Modifications>

Figure 13:
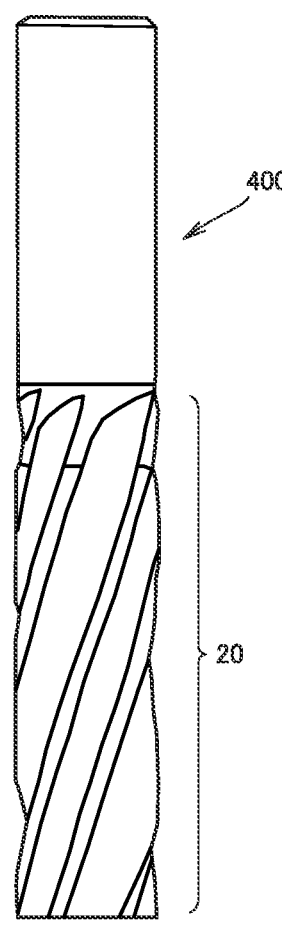
FIG. 13 is a side view of a radius end mill 400.

The details of the above-described third embodiment are applicable also to cutting tools other than cutting insert 300. FIG. 13 is a side view of a radius end mill 400. The details of the above-described third embodiment are applicable, for example, to radius end mill 400 as shown in FIG. 13. More specifically, protrusion 22 and first recess 23 are provided in each of the flank face and the rake face formed on tip end portion 20 of radius end mill 400.

Fourth Embodiment

The following describes the configuration of a tool according to the fourth embodiment. The tool according to the fourth embodiment is a measurement tool for measuring the surface roughness or the shape of a workpiece. More specifically, the tool according to the fourth embodiment is a stylus 500.

Figure 14:
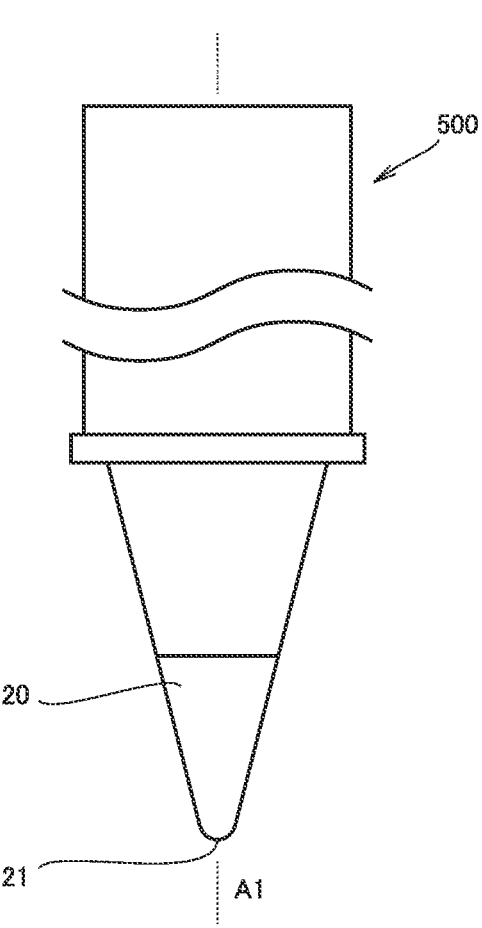
FIG. 14 is a side view of a stylus 500.

FIG. 14 is a side view of stylus 500. As shown in FIG. 14, stylus 500 has a tip end portion 20. Stylus 500 scans over a workpiece such that a surface 21 of stylus 500 comes into contact with the surface of the workpiece. Thereby, the surface roughness or the shape of the workpiece is measured. Surface 21 is provided with a protrusion 22 and a first recess 23. Surface 21 may further be provided with a second recess 24. It is assumed that a central axis A1 represents the central axis of stylus 500.

The following describes the effect of stylus 500. Since surface 21 is provided with protrusion 22 and first recess 23, the contact resistance occurring between the surface of the workpiece and surface 21 during scanning by stylus 500 can be reduced.

Fifth Embodiment

Hereinafter, the configuration of a tool according to the fifth embodiment will be described. The tool according to the fifth embodiment is a ball end mill 600. The following mainly describes the differences from the configuration of ball end mill 200, but the same description will not be repeated.

Figure 15:
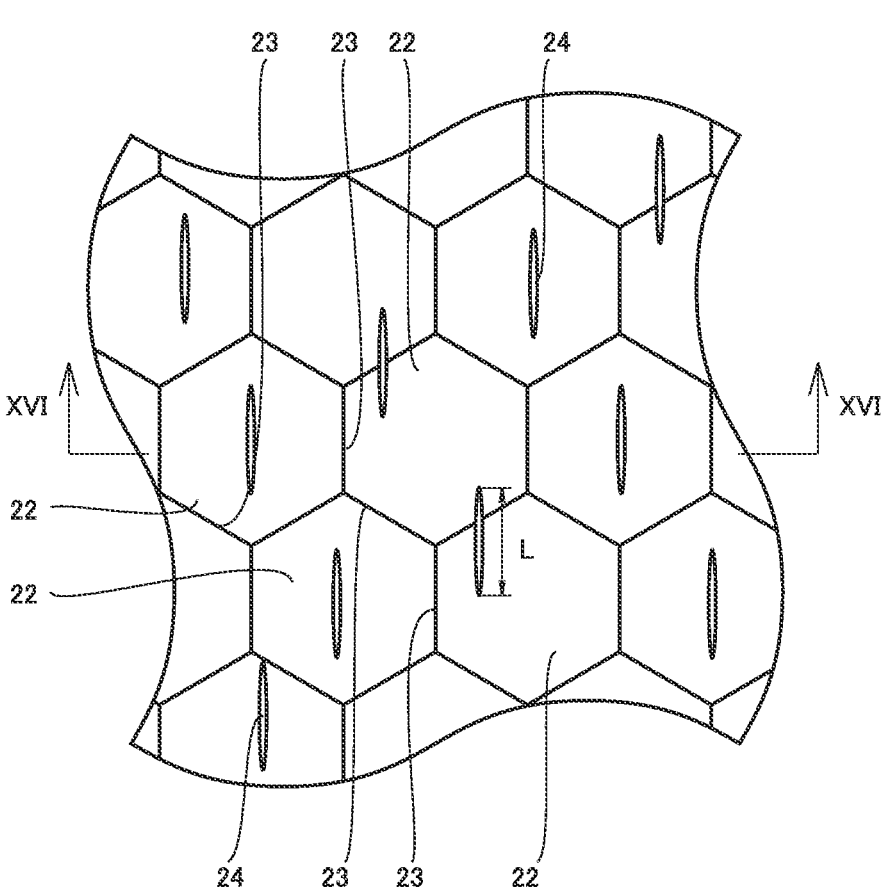
FIG. 15 is a schematic plan view of a partial spherical surface 21a of a ball end mill 600.
Figure 16:
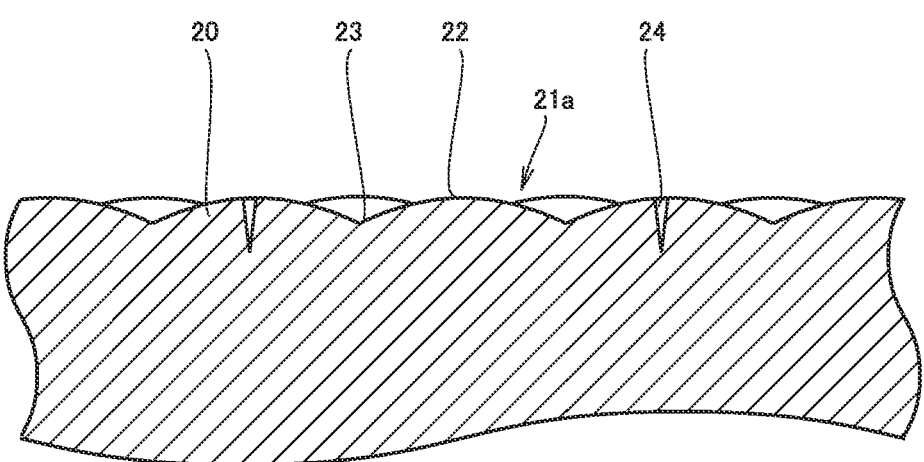
FIG. 16 is a cross-sectional view taken along a line XVI-XVI in FIG. 15.

FIG. 15 is a schematic plan view of a partial spherical surface 21*a* of ball end mill 600. FIG. 16 is a cross-sectional view taken along a line XVI-XVI in FIG. 15. As shown in FIGS. 15 and 16, in ball end mill 600, each second recess 24 has an elongated shape in a plan view. More specifically, in ball end mill 600, the length of second recess 24 in its longitudinal direction is greater than the width of second recess 24 in its width direction. The width direction of second recess 24 is orthogonal to the longitudinal direction of second recess 24. In other words, the length of second recess 24 in its longitudinal direction is 2×depth D×sin θ (an angle θ will be described later) or more. In ball end mill 600, second recess 24 is provided inside protrusion 22 or provided to extend across two adjacent protrusions 22.

In ball end mill 600, a length L represents the length of second recess 24 in its longitudinal direction in a plan view. Length L is preferably 100 μm or less. In ball end mill 600, a depth D (see FIG. 17) representing the depth of second recess 24 is preferably 0.5 μm or more and 20 μm or less. In ball end mill 600, an angle θ (see FIG. 17) represents the inclination angle of the side surface of second recess 24. Angle θ is preferably more than 0° and equal to or less than 45°. In the ball end mill, the area ratio of second recesses 24 is preferably 3 percent or more and 80 percent or less.

Depth D, angle θ, and length L are measured by the following method. Firstly, a contactless surface shape measuring apparatus (Infinite Focus G5 manufactured by Bruker Alicona) is employed to obtain three-dimensional data showing the shape of a portion of surface 21 (partial spherical surface 21*a*) provided with second recess 24 (this portion will be hereinafter referred to as a "measurement target portion"). From this three-dimensional data, the profile curve of the measurement target portion in a cross section of second recess 24 orthogonal to its longitudinal direction is calculated. It is assumed that the measurement length of the profile curve is 50 μm or more. The inclination, waviness, and the like of the profile curve are corrected according to JIS B 0651:2001. When the measurement target portion has a circular shape, this measurement target portion is converted to be shown in a Cartesian circle. The profile curve is calculated at 50 or more positions at intervals of 2 μm in the longitudinal direction of each second recess 24.

Secondly, positions P1, P2, and P3 are specified from the calculated profile curve of the measurement target portion along one cross section of second recess 24 orthogonal to its longitudinal direction. At position P1, the profile curve shows a minimum value. At each of positions P2 and P3, the profile curve shows a maximum value. Positions P2 and P3 are located closest to position P1 among the positions where the above-mentioned profile curve shows the maximum value.

Figure 17:
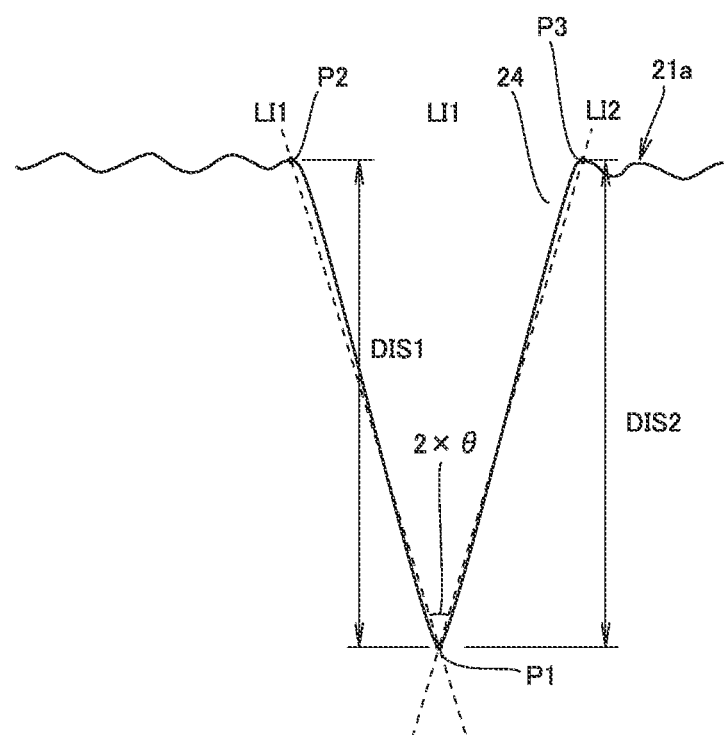
FIG. 17 is a schematic profile curve of a measurement target portion along a cross section of a second recess 24 orthogonal to a longitudinal direction of second recess 24.

FIG. 17 is a schematic profile curve of a measurement target portion along a cross section of second recess 24 orthogonal to its longitudinal direction. As shown in FIG. 17, a straight line LI1 is assumed to connect positions P1 and P2 while a straight line LI2 is assumed to connect positions P1 and P3. Angle θ is 0.5 times as large as the angle formed by straight lines LI1 and LI2. Depth D represents an average value of: a distance DIS1 as a difference in height between positions P2 and P1; and a distance DIS2 as a difference in height between positions P3 and P2. The above-described measurement is made for other cross sections to thereby obtain depth D for each cross section.

A depth $D_{avg}$ represents the average value of depths D of the respective cross sections. Length L represents the maximum value of the distance between the cross section along which depth D falls within the range of ±20 percent of depth $D_{avg}$ and the cross section along which position P1 falls within the range of ±2×D×sin θ. Note that length L may be measured from the observation view on the surface when length L can be clearly observed from the view on the surface.

The area of second recess 24 can be regarded as 2×depth D×sin θ×length L. Thus, the area ratio of second recesses 24 can be obtained by dividing the total area of second recesses 24 calculated based on this expression by the area of surface 21 provided with protrusions 22 and first recesses 23.

The width direction of each second recess 24 preferably extends in the circumferential direction around a rotation axis A. In a different perspective, the longitudinal direction of each second recess 24 is preferably orthogonal to the circumferential direction around rotation axis A. Note that rotation axis A passes through the center of partial spherical surface 21*a*.

The following describes a method of manufacturing ball end mill 600.

As in the method of manufacturing ball end mill 200, the method of manufacturing ball end mill 600 includes a preparing step S1, a joining step S2, a protrusion forming step S3, and a second recess providing step S4. In the method of manufacturing ball end mill 600, however, second recess 24 is provided by irradiating partial spherical surface 21*a* with laser in second recess providing step S4. In the method of manufacturing ball end mill 600, the processing conditions of the above-mentioned laser processing are changed to appropriately adjust depth D, angle θ, and length L.

The following describes the effect of ball end mill 600.

In ball end mill 600, the coolant flowing through each second recess 24 or air flowing during rotation of ball end mill 600 readily flows into a contact portion that contacts the workpiece, so that the cooling effect is enhanced and the lifetime of the tool is improved. Further, in ball end mill 600, the wear debris powder produced due to contact with the workpiece is readily discharged through each second recess 24 from the contact portion that contacts the workpiece, so that secondary wear resulting from such wear debris powder is less likely to occur, and thus, the lifetime of the tool is improved.

When length L is equal to or greater than 2×depth D×sin θ and equal to or less than 100 μm, such length L facilitates functioning of each second recess 24 as a path through which a coolant or the like flows and a path through which wear debris powder is discharged. Thus, the lifetime of the tool can be further improved. Further, when angle θ is more than 0° and equal to or less than 45°, the side surface of each second recess 24 is steeply inclined, so that the flow velocity of the coolant or the like is more likely to rise when the coolant or the like passes through each second recess 24. Thus, in this case, the cooling effect can be further enhanced, and the lifetime of the tool is further improved.

When the area ratio of second recesses 24 is 3 percent or more and 80 percent or less, an excessive increase in number of portions where stress concentrates in partial spherical surface 21*a* can be suppressed, so that the lifetime of the tool can be improved.

<Cutting Test>

A cutting test was conducted in order to check the effect of ball end mill 600. In this cutting test, Samples 4-1 to 4-11 each were used as a sample of ball end mill 600. The cutting test was conducted on the conditions of a rotation speed of ball end mill 600 of 10000 rpm, a tool feed rate of 100 mm/min, an amount of cut of 0.015 mm, and a width of cut of 0.02 mm. The cutting test was conducted while supplying a water-soluble coolant. The workpiece used in the cutting test was a plate of quartz glass of 10 mm×10 mm. In the cutting test, the lifetime of the tool of each sample was evaluated based on the cutting distance obtained until the point when wearing away of the flank face reached 50 μm.

In each of Samples 4-1 to 4-11, tip end portion 20 was formed of a nano-polycrystalline diamond. In each of Samples 4-1 to 4-11, depth D, angle θ, length L, the area ratio of second recesses 24, and whether boron was added or not were changed as shown in Table 7. A condition A defines that depth D is 0.5 μm or more and 20 μm or less. A condition B defines that angle θ is more than 0° and equal to or less than 45°. A condition C defines that length L is equal to or more than 2×depth D×sin θ and equal to or less than 100 μm. As described above, 2×depth D×sin θ corresponds to the width of each second recess 24. A condition D defines that the area ratio of second recesses 24 is 3 percent or more and 80 percent or less. In each of Samples 4-1 to 4-11, each second recess 24 was provided such that its width direction extended in the circumferential direction around rotation axis A. In each of Samples 4-1 to 4-11, the skewness at surface 21 was less than 0, height H fell within the range of 0.05 μm or more and 20 μm or less, and the arithmetic mean height at surface 21 fell within the range of 0.05 μm or more and 5 μm or less.

In each of Samples 4-1 to 4-7, condition D was satisfied. In contrast, in Sample 4-11, condition D was not satisfied. Samples 4-1 to 4-7 each were more excellent in lifetime of the tool than Sample 4-11. The above-mentioned comparison empirically showed that the lifetime of the tool was improved when condition D was satisfied.

Sixth Embodiment

Hereinafter, a tool according to the sixth embodiment will be described. The tool according to the sixth embodiment is a cutting insert 700. The following mainly describes the differences from the configuration of cutting insert 300, but the same description will not be repeated.

In cutting insert 700, surface 21 is provided with second recesses 24 similar to those in ball end mill 600. In cutting insert 700, preferably, each second recess 24 is provided in at least one of rake face 21*d* and flank face 21*e*. In cutting insert 700, preferably, the width direction of each second recess 24 extends in the direction in which cutting edge 21*f* extends. According to cutting insert 700, the lifetime of the tool is improved as in ball end mill 600.

Seventh Embodiment

Hereinafter, a tool according to the seventh embodiment will be described. The tool according to the seventh embodiment is a stylus 800. The following mainly describes the differences from the configuration of stylus 500, but the same description will not be repeated.

In stylus 800, surface 21 is provided with second recesses 24 similar to those in ball end mill 600. In stylus 800, preferably, the width direction of each second recess 24

TABLE 7

| | Ssk at Surface 21 | Height H (μm) | Sa in Protrusion (μm) | Addition of Boron | Depth D (μm) | Angle θ (°) | 2 × sin θ × D (μm) | Length L (μm) | Area Ratio of Second Recesses 24 (%) | Lifetime of Tool (m) |
|---|---|---|---|---|---|---|---|---|---|---|
| Sample 4-1 | −0.2 | 0.6 | 0.3 | Added | 0.7 | 17 | 0.42 | 2.0 | 47.5 | 89 |
| Sample 4-2 | −0.3 | 2.2 | 0.9 | Added | 1.8 | 31 | 1.85 | 44 | 14.2 | 91 |
| Sample 4-3 | −0.5 | 5.8 | 1.4 | Added | 6.4 | 42 | 8.56 | 90 | 72.3 | 79 |
| Sample 4-4 | −0.1 | 11.3 | 2.9 | Added | 8.3 | 2 | 0.58 | 40 | 29.1 | 81 |
| Sample 4-5 | −0.3 | 17.2 | 4.1 | Added | 15.2 | 9 | 4.76 | 72 | 53.6 | 98 |
| Sample 4-6 | −0.2 | 6.4 | 1.8 | Added | 19.1 | 13 | 8.59 | 10.0 | 13.7 | 101 |
| Sample 4-7 | −0.2 | 3.1 | 1.2 | Not Added | 2.1 | 22 | 1.57 | 54 | 31.5 | 69 |
| Sample 4-8 | −0.4 | 19.6 | 4.8 | Added | 0.3 | 4 | 0.04 | 42 | 31.6 | 23 |
| Sample 4-9 | −0.2 | 11.9 | 3.0 | Added | 17.3 | 59 | 29.66 | 72 | 15.2 | 19 |
| Sample 4-10 | −0.1 | 7.3 | 1.5 | Added | 4.3 | 41 | 5.64 | 4.0 | 42.6 | 25 |
| Sample 4-11 | −0.3 | 5.2 | 1.8 | Added | 9.1 | 11 | 3.47 | 22.0 | 87.5 | 18 |

In each of Samples 4-1 to 4-7, condition A was satisfied. In contrast, in Sample 4-8, condition A was not satisfied. Samples 4-1 to 4-7 were more excellent in lifetime of the tool than Sample 4-8. The above-mentioned comparison empirically showed that the lifetime of the tool was improved when condition A was satisfied.

In each of Samples 4-1 to 4-7, condition B was satisfied. In contrast, in Sample 4-9, condition B was not satisfied. Samples 4-1 to 4-7 each were more excellent in lifetime of the tool than Sample 4-9. The above-mentioned comparison empirically showed that the lifetime of the tool was improved when condition B was satisfied.

In each of Samples 4-1 to 4-7, condition C was satisfied. In contrast, in Sample 4-10, condition C was not satisfied. Samples 4-1 to 4-7 each were more excellent in lifetime of the tool than Sample 4-10. The above-mentioned comparison empirically showed that the lifetime of the tool was improved when condition C was satisfied.

extends in the circumferential direction around central axis A1. According to stylus 800, wear debris powder produced due to contact with the workpiece is readily discharged from the contact portion through each second recess 24, and thus, secondary wear resulting from the wear debris powder is less likely to occur, so that the lifetime of the tool is improved.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

10 main body portion, 10*a* first end, 10*b* second end, 11 shank, 11*a* first end, 11*b* second end, 12 neck, 12*a* first end, 12b second end, 13 connection layer, 20 tip end portion, 21 surface, 21a partial spherical surface, 21b groove, 21c cutting edge, 21d rake face, 21da first portion, 21db second portion, 21e flank face, 21f cutting edge, 22 protrusion, 23 first recess, 24 second recess, 30 base body, 30a first surface, 30b second surface, 30c side surface, 31 attachment portion, 100 ball end mill, 200, 200A ball end mill, 300 cutting insert, 400 radius end mill, 500 stylus, 600 ball end mill, 700 cutting insert, 800 stylus, A rotation axis, A1 central axis, D depth, L length, LI1 straight line, LI2 straight line, H height, R diameter, S1 preparing step, S2 joining step, S3 protrusion forming step, S4 second recess providing step, S5 face forming step, DIS1, DIS2 distance, P1, P2, P3 position, θ angle.

The invention claimed is:

1. A tool comprising a tip end portion, wherein
the tip end portion has a surface,
at least a part of the surface includes a plurality of protrusions, a first recess provided by contact between ends of two adjacent protrusions of the protrusions, and a second recess different from the first recess, and
the second recess is provided inside each of the protrusions or provided to extend across the two adjacent protrusions,
wherein the protrusions are partial spherical surfaces with the second recesses cut into the partial spherical surfaces, and
wherein the entire circumference of each of the protrusions is surrounded by the first recesses.

2. The tool according to claim 1, wherein a depth of the second recess is 0.5 μm or more and 20 μm or less.

3. The tool according to claim 1, wherein a length of the second recess in a longitudinal direction of the second recess is equal to or greater than a value obtained by multiplying a depth of the second recess by twice as large as a sine of an inclination angle of a side surface of the second recess, and equal to or less than 100 μm.

4. The tool according to claim 1, wherein an inclination angle of a side surface of the second recess is more than 0° and equal to or less than 45°.

5. The tool according to claim 1, wherein an area ratio of the second recesses in the surface is 3 percent or more and 80 percent or less.

6. The tool according to claim 1, wherein the tool is a measurement tool for measuring surface roughness or a shape of a workpiece.

7. The tool according to claim 1, wherein the tool is a processing tool for processing a workpiece.

8. The tool according to claim 7, wherein
the surface includes a partial spherical surface, and
the tool is rotated around a rotation axis to process the workpiece, the rotation axis passing through a center of the partial spherical surface.

9. The tool according to claim 8, wherein a width direction of the second recess extends in a circumferential direction around the rotation axis.

10. The tool according to claim 7, wherein the surface includes a groove and a cutting edge that is formed along a ridgeline between the groove and a partial spherical surface.

11. The tool according to claim 7, wherein a height of each of the protrusions is 0.05 μm or more and 20 μm or less.

12. The tool according to claim 7, wherein an arithmetic mean height of the surface in each of the protrusions is 0.05 μm or more and 5 μm or less.

13. The tool according to claim 7, wherein a skewness parameter in a portion provided with the protrusions and the first recesses in the surface is less than 0.

14. The tool according to claim 1, wherein
the tool is a cutting tool for cutting a workpiece, and
the surface includes a rake face, a flank face contiguous to the rake face, and a cutting edge formed along a ridgeline between the rake face and the flank face.

15. The tool according to claim 1, wherein the tip end portion is formed of a nano-polycrystalline diamond.

16. The tool according to claim 15, wherein the nano-polycrystalline diamond contains atoms belonging to Group 13 or Group 15 in a long periodic table.

17. The tool according to claim 1, wherein the tip end portion is formed of binderless cubic boron nitride.

18. A method of manufacturing a tool, the method comprising:
preparing a tip end portion; and
by irradiation with laser, forming a plurality of protrusions in at least a part of a surface of the tip end portion,
a first recess being provided in a part of the surface of the tip end portion by contact between ends of two adjacent protrusions of the protrusions, the method further comprising:
by irradiation with laser, providing a second recess to be inside each of the protrusions or to extend across the two adjacent protrusions,
wherein the protrusions are partial spherical surfaces with the second recesses cut into the partial spherical surfaces, and
wherein the entire circumference of each of the protrusions is surrounded by the first recesses.

19. The method of manufacturing a tool according to claim 18, further comprising, by irradiation with laser, forming a rake face and a flank face contiguous to the rake face on the surface of the tip end portion.

20. A tool comprising a tip end portion, wherein
the tip end portion has a surface,
at least a part of the surface includes a plurality of protrusions, a first recess provided by contact between ends of two adjacent protrusions of the protrusions, and a second recess different from the first recess, and
the second recess is provided inside each of the protrusions or provided to extend across the two adjacent protrusions,
wherein the protrusions are partial spherical surfaces with the second recesses cut into the partial spherical surfaces, and
wherein each of the protrusions is surrounded by the first recesses,
wherein each of the first recesses has a linear shape in plan view and each protrusion is formed by an inside region surrounded by a plurality of the linear shape first recesses.

* * * * *